(12) United States Patent
Lima et al.

(10) Patent No.: US 11,613,069 B2
(45) Date of Patent: Mar. 28, 2023

(54) METHOD OF FORMING A CURVED, RIGID DISPLAY ARTICLE

(71) Applicant: Visteon Global Technologies, Inc., Van Buren Township, MI (US)

(72) Inventors: Nelson Lima, Lisbon (PT); Antonio Aires, Lisbon (PT); Mathias Stegemann, Munich (DE); Andre Mendiboure, Rueil Malmaison (FR); Aleksandar Georgi Lukanov, Sofia (BG); Richard K. McMillan, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 292 days.

(21) Appl. No.: 16/925,524

(22) Filed: Jul. 10, 2020

(65) Prior Publication Data

US 2021/0008785 A1    Jan. 14, 2021

Related U.S. Application Data

(60) Provisional application No. 62/872,859, filed on Jul. 11, 2019.

(51) Int. Cl.
*B29C 64/106* (2017.01)
*G02F 1/13357* (2006.01)
*G02F 1/1333* (2006.01)
*G02B 27/01* (2006.01)
*B33Y 10/00* (2015.01)
*B29L 31/34* (2006.01)

(52) U.S. Cl.
CPC ........ *B29C 64/106* (2017.08); *G02B 27/0172* (2013.01); *G02F 1/133308* (2013.01); *G02F 1/133608* (2013.01); *B29L 2031/3475* (2013.01); *B33Y 10/00* (2014.12); *G02B 2027/0178* (2013.01); *G02F 1/133325* (2021.01)

(58) Field of Classification Search
CPC combination set(s) only.
See application file for complete search history.

(56) References Cited

U.S. PATENT DOCUMENTS 9,482,880 B1 * 11/2016 Chandrasekhar ....... G02F 1/153

FOREIGN PATENT DOCUMENTS

WO    WO-2019154539 A1 *  8/2019  ......... G02B 27/0093

* cited by examiner

*Primary Examiner* — Lucy P Chien
(74) *Attorney, Agent, or Firm* — Quinn IP Law

(57) ABSTRACT

A method of forming a curved, rigid display article includes providing a first substrate having a first initial geometry and a second substrate having a second initial geometry, wherein the first substrate and the second substrate are bendable at room temperature. The method includes optically bonding the first substrate and the second substrate together with a layer of optical bonding material to form an initial workpiece having a geometry that matches one of the first initial geometry and the second initial geometry. The method also includes shaping the initial workpiece to form a shaped workpiece having a radius of curvature of at least 0.1 mm. The method also includes structurally bonding together the shaped workpiece and a curved frame that is not flexible and has a final radius of curvature of from 0.1 mm to 300 mm with an adhesive to thereby form the curved, rigid display article.

13 Claims, 6 Drawing Sheets

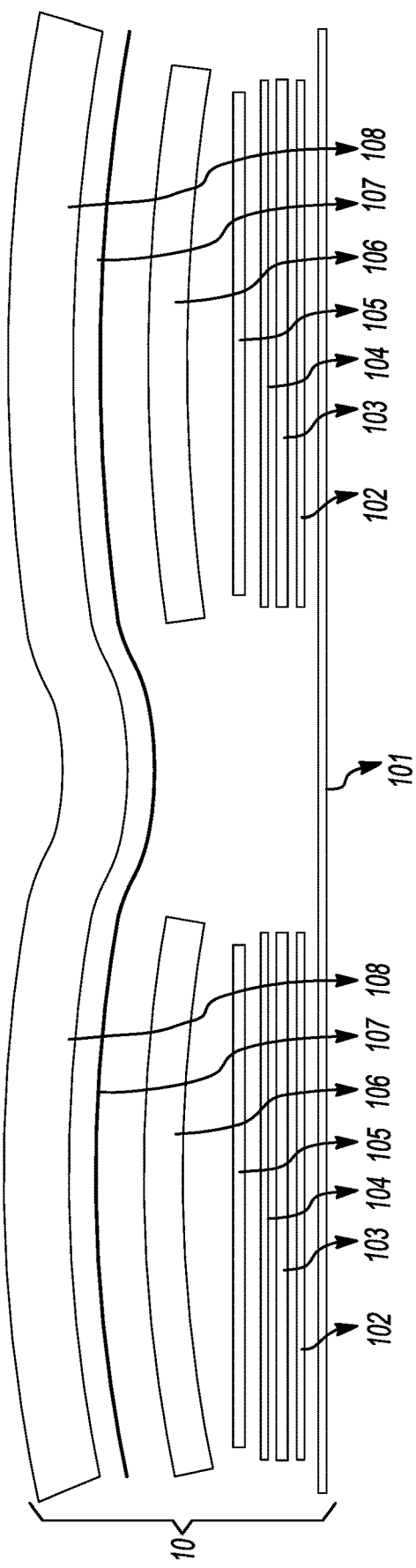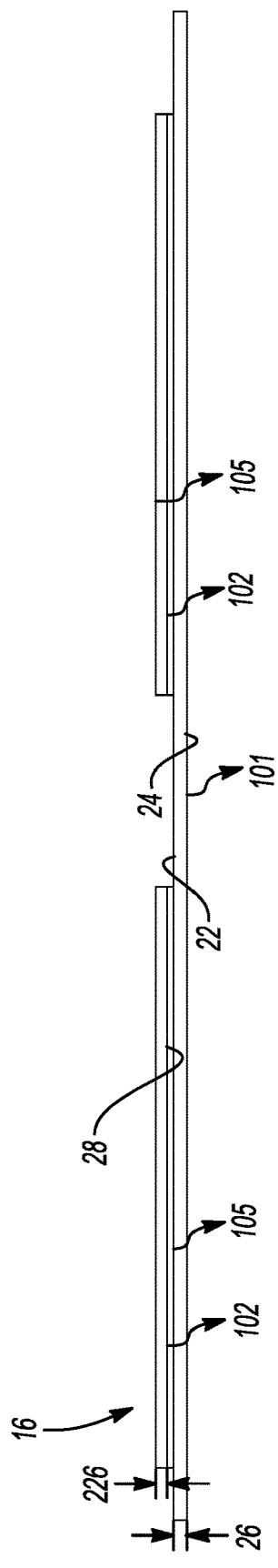

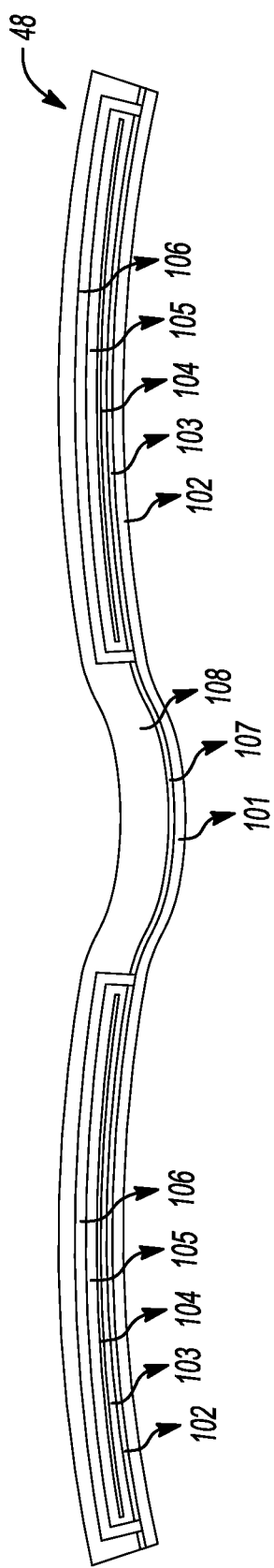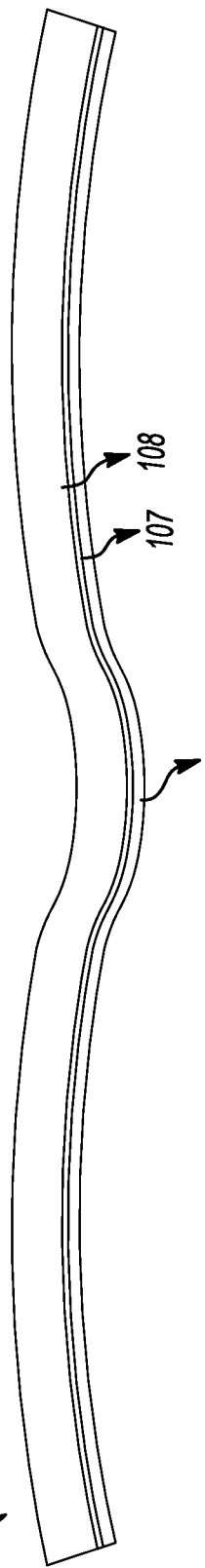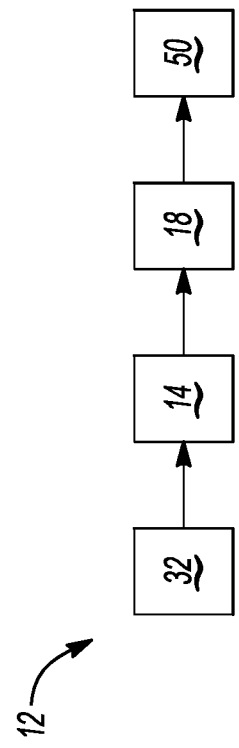

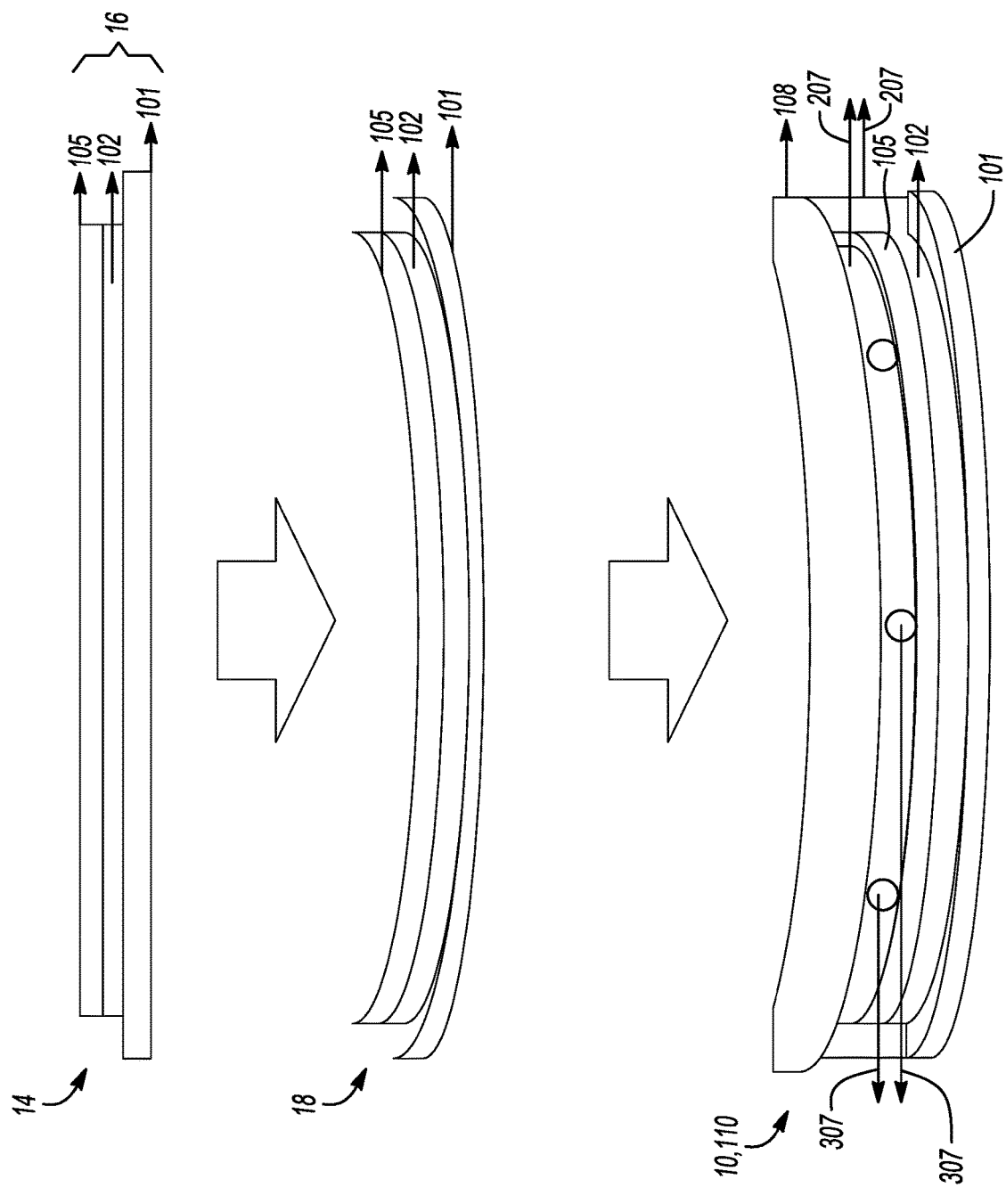

METHOD OF FORMING A CURVED, RIGID DISPLAY ARTICLE

CROSS-REFERENCE TO RELATED APPLICATIONS

This application claims the benefit of and priority to U.S. Provisional Patent Application No. 62/872,859, filed on Jul. 11, 2019, which is incorporated herein by reference in its entirety.

INTRODUCTION

The disclosure relates to a method of forming a curved, rigid display article.

Display articles, such as liquid crystal displays, may be useful for consumer electronics, computer equipment, industrial machinery controls, automobiles, and aerospace applications. Such display articles may include one or more layers bonded to one another and disposed over a liquid crystal display. For example, a protective overlay or cover lens may be useful for protecting the liquid crystal display from mechanical and environmental forces. Other layers of the display article may include touch-sensitive panels, optical filters, heaters, and electromagnetic interference shields.

Design requirements for certain applications may require a curved, rigid display article that is operable along a curved support or frame.

SUMMARY

A method of forming a curved, rigid display article includes providing a first substrate having a first initial geometry and a second substrate having a second initial geometry. The first substrate and the second substrate are bendable at room temperature. The method also includes optically bonding the first substrate and second substrate together with an optical bonding material to form an initial workpiece having a geometry that matches one of the first initial geometry and the second initial geometry. In addition, the method includes shaping the initial workpiece to form a shaped workpiece having a radius of curvature of at least 0.1 mm. Further, the method includes structurally bonding together the shaped workpiece and a curved frame that is not flexible and has a final radius of curvature of from 0.1 mm to 300 mm with a structural adhesive to thereby form the curved, rigid display article.

In one aspect, the method may further include optically bonding together a third substrate and the initial workpiece.

In another aspect, structurally bonding may include dispensing a first adhesive having a first hardness and a first cure time and a second adhesive having a second hardness that is greater than the first hardness and a second cure time that is less than the first cure time onto at least one of the shaped workpiece and the curved frame.

In an additional aspect, dispensing the first adhesive may include depositing the first adhesive along an entire surface of at least one of the shaped workpiece and the curved frame.

In a further aspect, dispensing the second adhesive may include depositing the second adhesive as a plurality of single points each spaced apart from one another without depositing the second adhesive along the entire surface.

In yet another aspect, the first substrate may have a first radius of curvature of at least 0.1 mm and the second substrate may have a second radius of curvature that is greater than the first radius of curvature and less than or equal to 300 mm. Optically bonding may include iteratively dispensing a plurality of layers of the optical bonding material onto the first substrate.

In one aspect, optically bonding may include 3-D printing the plurality of layers onto the first substrate in a first portion having a first total height and in a second portion having a second total height that is less than the first total height.

In another aspect, the first substrate may have a top surface and a bottom surface spaced apart from the top surface. Further, optically bonding may include iteratively dispensing a plurality of layers of a dam material onto the first substrate along the top surface to thereby form a dam on the first substrate.

In an additional aspect, the first substrate may have a first radius of curvature of at least 0.1 mm and the second substrate may have a second radius of curvature that is greater than the first radius of curvature and less than or equal to 300 mm. Further, structurally bonding may include iteratively dispensing a plurality of layers of the structural adhesive onto the first substrate.

In a further aspect, structurally bonding may include 3-D printing the plurality of layers onto the first substrate in a first portion having a first total height and a second portion having a second total height that is less than the first total height.

In yet another aspect, optically bonding may further include curing the optical bonding material.

In one aspect, a curved, rigid display article may be formed by providing a first substrate having a first initial geometry and a second substrate having a second initial geometry, wherein the first substrate and the second substrate are bendable at room temperature. The curved, rigid display article may be further formed by optically bonding the first substrate and the second substrate together with the optical bonding material to form an initial workpiece having a geometry that matches one of the first initial geometry and the second initial geometry. In addition, the curved, rigid display article may be further formed by shaping the initial workpiece such that the initial workpiece has an initial radius of curvature to form a shaped workpiece. Further, the curved, rigid display article may be formed by structurally bonding together the shaped workpiece and a curved frame that is not flexible and has a final radius of curvature of from 0.1 mm to 300 mm with a structural adhesive to thereby form the curved, rigid display article. The curved, rigid display article may include the first substrate and the second substrate spaced apart from the first substrate, and a first layer of optical bonding material disposed between and in contact with the first substrate and the second substrate. In addition, the curved, rigid display article may include the curved frame adhered to the first substrate, and the structural adhesive disposed between and in contact with the first substrate and the curved frame.

In another aspect, the curved, rigid display article may include a third substrate spaced apart from the second substrate, and a second layer of optical bonding material disposed between and in contact with the second substrate and the third substrate.

In an additional aspect, the curved, rigid display article may include a curved backlight facing the third substrate and surrounding the second substrate and the third substrate.

In yet another aspect, the first layer of optical bonding material may have a thickness of from 0.1 mm to 0.6 mm.

In one aspect, the first substrate and the second substrate may not have a radius of curvature at room temperature.

In another aspect, the optical bonding material may be one of a liquid optically clear adhesive and a solid optically clear adhesive.

A method of forming a curved, rigid display article includes providing a first substrate and a second substrate, wherein the first substrate has a first radius of curvature at room temperature and the second substrate has a second radius of curvature at room temperature that is larger than the first radius of curvature. The method also includes optically bonding the first substrate and second substrate together with the optical bonding material to form an initial workpiece such that the first radius of curvature is equal to the second radius of curvature. In addition, the method includes shaping the initial workpiece to thereby form a shaped workpiece. Further, the method includes structurally bonding together the shaped workpiece and a curved frame that is not flexible and has a final radius of curvature of from 0.1 mm to 300 mm to thereby form the curved, rigid display article.

In one aspect, shaping the initial workpiece may include curving or flattening the initial workpiece.

In another aspect, the method may include prior to shaping, optically bonding together a third substrate and the second substrate with a second layer of optical bonding material; and attaching a curved backlight to the third substrate such that the curved backlight faces the third substrate and surrounds the second substrate and the third substrate.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 3 is a schematic illustration of an exploded cross-sectional view of the curved, rigid display article of FIG. 1.

FIG. 4 is a schematic illustration of a cross-sectional view of an optical bonding material disposed between a first substrate and a second substrate to form a portion of the curved, rigid display article of FIG. 1.

FIG. 7A is a schematic illustration of a cross-sectional view of a frame bonded to the first, second, third, and additional substrates of FIGS. 4-6B.

FIG. 7B is a schematic illustration of a front view of the frame of FIG. 7A.

FIG. 8 is a flowchart illustration of a method of forming the curved, rigid display article of FIGS. 1 and 2.

FIG. 9 is a schematic illustration of a cross-sectional view of a portion of the method of FIG. 8.

DETAILED DESCRIPTION

Figure 1:
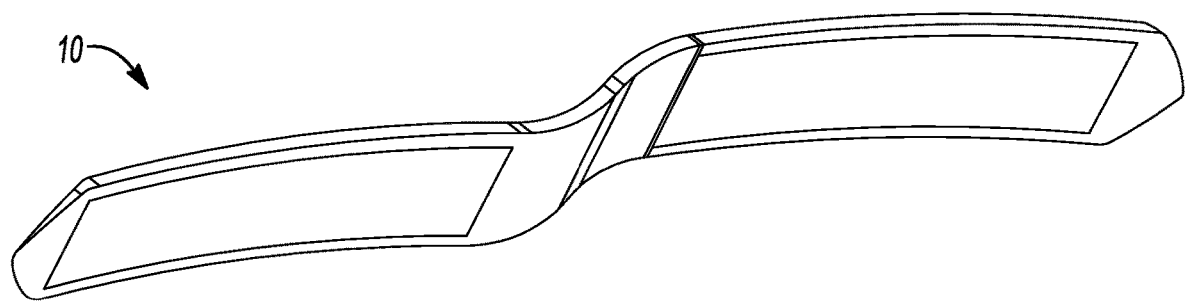
FIG. 1 is a schematic illustration of a perspective view of a curved, rigid display article.
Figure 2:
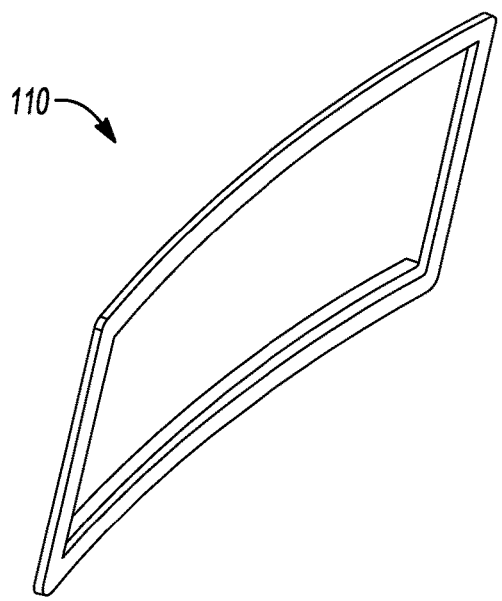
FIG. 2 is a schematic illustration of a perspective view of another embodiment of the curved, rigid display article of FIG. 1.

Referring to the Figures, wherein like reference numerals refer to like elements, a curved, rigid display article 10, 110 and a method 12 of forming the curved, rigid display article 10, 110 are shown generally in FIGS. 1, 2, and 8. The curved, rigid display article 10, 110 and method 12 may be useful for applications requiring a flexible first substrate 101 (FIG. 3) and a flexible second substrate 105 (FIG. 3) optically bonded together while still flexible with an optical bonding material 102 such as, for example, a liquid optically clear adhesive or a solid optically clear adhesive to form the curved, rigid display article 10, 110. In particular, the method 12 may be useful for forming curved and rigid display articles 10, 110 that are free from optical defects and that retain a curved shape. That is, as set forth in more detail below, the method 12 includes first optically bonding 14 together the first substrate 101 and the second substrate 105 to form an initial workpiece 16 (FIG. 4), then shaping 18 or curving the initial workpiece 16 to form a shaped workpiece 48 (FIG. 7B), and finally structurally bonding the shaped workpiece 48 to a curved frame 108 to form the curved, rigid display article 10, 110. As such, the method 12 may be characterized as a bond and bend process.

Therefore, the curved, rigid display article 10, 110 and method 12 may be useful for automotive applications such as, but not limited to, curved instrument clusters as shown in FIG. 1 or curved infotainment devices as shown in FIG. 2 that may wrap along a dashboard of a vehicle. Alternatively, the curved, rigid display article 10, 110 and method 12 may be useful for non-automotive applications, such as, but not limited to, industrial vehicles, recreational off-road vehicles, aircraft, trains, and the like. In addition, the curved, rigid display article 10, 110 and method 12 may be useful for non-vehicular applications such as, but not limited to, televisions, computer displays, smartphones, watches, tablets, and the like.

Referring now to FIG. 4, the curved, rigid display article 10, 110 formed by the method 12 includes the first substrate 101 and the second substrate 105 spaced apart from the first substrate 101. The first substrate 101 may have a top surface 22 and a bottom surface 24 spaced apart from the top surface 22. The top surface 22 may be configured for receiving the optical bonding material 102, as set forth in more detail below. In one example, the first substrate 101 may have a rectangular shape. In addition, the first substrate 101 may have a first thickness 26.

The first substrate 101 may be flat at room temperature when in a relaxed state. However, the first substrate 101 is bendable at room temperature. That is, the first substrate 101 may be sufficiently flexible so as to have a first radius of curvature of at least 0.1 mm, e.g., from 0.1 mm to 300 mm, at room temperature. Therefore, the first substrate 101 may be formed from a suitably flexible material such as, but not limited to, polycarbonate, cold form glass, and the like. Although the first substrate 101 may be any portion or layer of the eventual curved, rigid display article 10, 110, for ease of reference, the first substrate 101 may be a bottom substrate that may be configured as a cover lens. In one example, the first substrate 101 may be formed from a cold formed material such as aluminum.

The first substrate 101 may have a first initial geometry. For example, in one embodiment, the first initial geometry may be curved at room temperature and the first substrate 101 may have the first radius of curvature of from 0.1 mm to 300 mm. Alternatively, the first initial geometry may be flat at room temperature and the first substrate 101 may not have a radius of curvature. Regardless, the first substrate 101 is flexible at room temperature. That is, the first substrate 101 may not be rigid at room temperature.

As described with continued reference to FIG. 4, the second substrate 105 is spaced apart from the first substrate 101. Further, the second substrate 105 may have a lower surface 28 configured for receiving the optical bonding material. Further, the second substrate 105 may have a second thickness 226 that is less than, greater than, or equal to the first thickness 26. In one example, the second substrate 105 may have a rectangular shape.

The second substrate 105 may be flat at room temperature when in a relaxed state. However, the second substrate 105 is bendable at room temperature. That is, the second substrate 105 may be sufficiently flexible so as to have a second radius of curvature of at least 0.1 mm, e.g., from 0.1 mm to 300 mm, at room temperature. Therefore, the second substrate 105 may be formed form a suitably flexible material such as, but not limited to, polycarbonate, cold form glass, and the like. Although the second substrate 105 may be any portion or layer of the eventual curved, rigid display article 10, 110, for ease of reference, the second substrate 105 may be a top substrate that may be configured as a display panel. For example, the display panel may be an organic light-emitting diode display panel that does not require a backlight or the display panel may be a liquid crystal display panel dissociated from a backlight, i.e., the liquid crystal display panel and the backlight may be two separate components that each remain flexible at room temperature.

The second substrate 105 may have a second initial geometry. For example, in one embodiment, the second initial geometry may be curved at room temperature and the second substrate 105 may have the second radius of curvature of from 0.1 mm to 300 mm. Alternatively, the second initial geometry may be flat at room temperature and the second substrate 105 may not have a radius of curvature. Regardless, the second substrate 105 is flexible at room temperature. That is, the second substrate 105 may not be rigid at room temperature.

Further, the initial geometries of the first substrate 101 and the second substrate 105 may be the same or different. That is, one or more of the first substrate 101 and the second substrate 105 may have a radius of curvature, or one or more of the first substrate 101 and the second substrate 105 may not have a radius of curvature at room temperature. For example, the first substrate 101 may be curved and the second substrate 105 may be flat, or the first substrate 101 may be flat and the second substrate 105 may be curved.

Referring again to FIG. 4, the curved, rigid display article 10, 110 also includes the optical bonding material 102 disposed between and in contact with the first substrate 101 and the second substrate 105. That is, the optical bonding material 102 may be sandwiched between the first substrate 101 and the second substrate 105. In one example, the optical bonding material 102 may be dispensed onto the first substrate 101 and/or the second substrate 105 in a fill pattern (not shown) and a contact pattern (not shown), respectively, and may be suitable for spreading along the first substrate 101 and second substrate 105 and filling an entirety of the first substrate 101 and the second substrate 105 during bonding of the first and second substrates 101, 105.

The optical bonding material 102 may be a liquid optically clear adhesive that may be dispensed as a dual component silicone from a dispenser (not shown) or may be a solid optically clear adhesive. Regardless, the optical bonding material 102 may be curable to form an optically clear bond between the first substrate 101 and the second substrate 105 and may be sufficiently flexible to bend or curve with the first substrate 101 and the second substrate 105. The first layer of optical bonding material 102 may have a thickness 126 of from 0.1 mm to 0.6 mm.

The thickness 126 and softness of the optical bonding material 102 may optimize the optical performance of the curved, rigid display article 10, 110. In particular, the optical bonding material 102 may minimize stress transmitted to the second substrate 105 or display layer. Since such transmitted stresses may otherwise contribute to black homogeneity uniformity issues and optical performance issues of the curved, rigid display article 10, 110, the optical bonding material 102 as arranged and described may absorb and dampen stress on the second substrate 105.

Further, the optical bonding material 102 may be sufficiently soft so as to bend with the first substrate 101 and the second substrate 105 during shaping 18 (FIG. 8) of the initial workpiece 16. Stated differently, the optical bonding material 102 may be capable of accepting deformation when bent from a flat shape to a curved shape without introducing any stress on the second substrate 105. In addition, the optical bonding material 102 may provide the curved, rigid display article 10, 110 with excellent robustness and display performance, and may minimize a distance between the first substrate 101 and the second substrate 105. Further, the optical bonding material 102 may provide the curved, rigid display article 10, 110 with a reduced reflection between the first substrate 101 and the second substrate 105, and a refractive incidence almost coincident to all layers of the curved, rigid display article 10, 110. That is, the layer of optical bonding material 102 may have a refractive index that is similar to the refractive indices of the first substrate 101 and the second substrate 105, e.g., about 1.5.

Although not shown in detail, the curved, rigid display article 10, 110 may also include a dam disposed on the first substrate 101 and in contact with the optical bonding material 102. That is, the dam may be configured for restraining a flow of the optical bonding material 102 during bonding of the first substrate 101 and the second substrate 105. As a non-limiting example, the dam may include eight segments arranged symmetrically along the top surface 22 of the first substrate 101. In addition, the dam may maintain a determined distance between the first substrate 101 and the second substrate 105 and may ensure alignment of the first substrate 101 with respect to the second substrate 105. During initial alignment of the first substrate 101 and the second substrate 105, the dam may be spaced apart from the optical bonding material 102. The dam may be formed from a curable dam material 30 (FIG. 10) such as a dual component silicone and may be pre-cured by exposing the dam material to ultraviolet radiation and fully cured upon compression of the optical bonding material 102.

Figure 5:
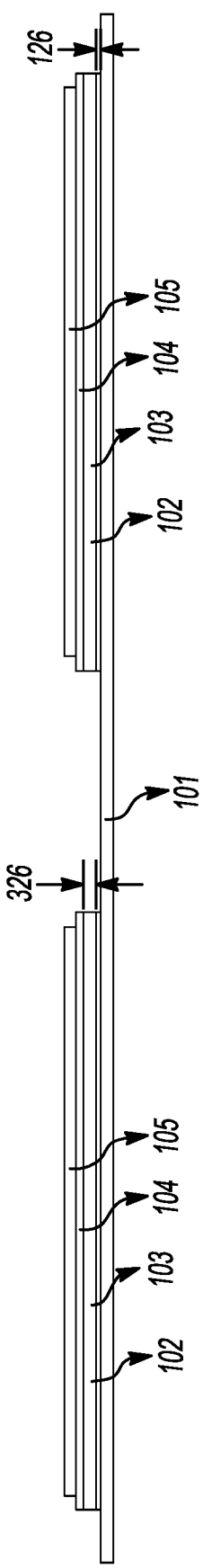
FIG. 5 is a schematic illustration of a cross-sectional view of a third substrate optically bonded to the second substrate of FIG. 4.

Referring now to FIG. 5, in some embodiments, the curved, rigid display article 10, 110 may also include a third substrate 103 spaced apart from the second substrate 105. Although the third substrate 103 may be any portion or layer of the eventual curved, rigid display article 10, 110, for ease of reference, the third substrate 103 may be a middle substrate that may be configured as a touch screen or panel.

In one example, the third substrate 103 may have a rectangular shape. In addition, the third substrate 103 may have a third thickness 326 (FIG. 5). In addition, the third substrate 103 may be flat at room temperature when in a relaxed state. However, the third substrate 103 may be bendable at room temperature. That is, the third substrate 103 may be sufficiently flexible so as to have a third radius of curvature of at least 0.1 mm, e.g., from 0.1 mm to 300 mm, at room temperature. Therefore, the third substrate 103 may be formed form a suitably flexible material.

Further, the third substrate 103 may have a third initial geometry. For example, in one embodiment, the third initial geometry may be curved at room temperature and the third substrate 103 may have the third radius of curvature of from 0.1 mm to 300 mm. Alternatively, the third initial geometry may be flat at room temperature and the third substrate 103 may not have a radius of curvature. Regardless, the third substrate 103 may be flexible at room temperature. That is, the third substrate 103 may not be rigid at room temperature.

As described with continued reference to FIG. 5, the curved, rigid display article 10, 110 may also include a second layer of optical bonding material 104 disposed between and in contact with the second substrate 105 and the third substrate 103. The optical bonding material that forms the second layer 104 may be a liquid optically clear adhesive that may be dispensed as a dual component silicone from a dispenser (not shown), may be a solid optically clear adhesive, or may be a hybrid optically clear adhesive that requires a comparatively slightly longer curing time than the liquid or solid optically clear adhesives. Further, the second layer optical bonding material 104 may be the same or different from the first layer of optical bonding material 102 sandwiched between the first substrate 101 and the second substrate 105. Regardless, the optical bonding material that forms the second layer 104 may be curable to form an optically clear bond between the second substrate 105 and the third substrate 103 and may be sufficiently flexible to bend or curve with the first substrate 101 and the third substrate 103. The second layer of optical bonding material 104 may have a thickness of from 0.1 mm to 0.6 mm.

Figure 6A:
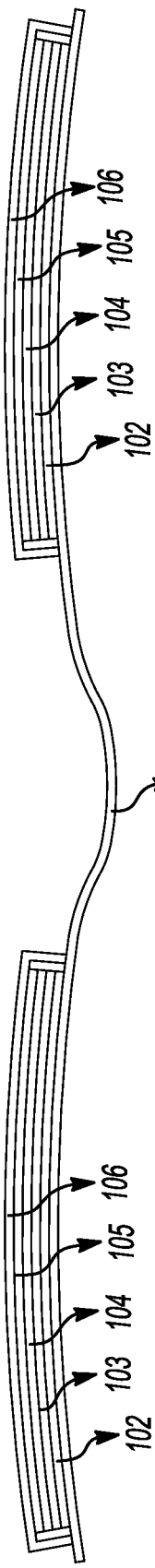
FIG. 6A is a schematic illustration of a cross-sectional view of an additional substrate surrounding the third substrate of FIG. 5.
Figure 6B:
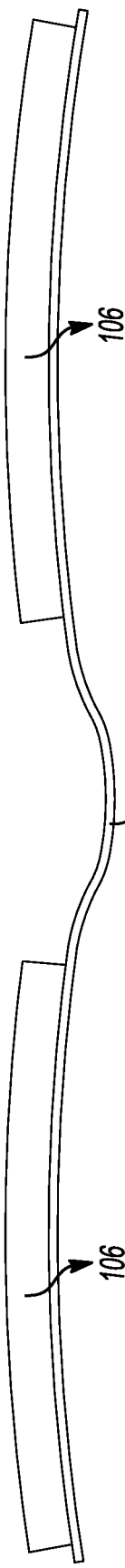
FIG. 6B is a schematic illustration of a front view of the additional substrate of FIG. 6A.

Referring now to FIGS. 6A and 6B, for some embodiments, the curved, rigid display article 10, 110 may also include a curved backlight 106 facing the third substrate 103 and surrounding the second substrate 105 and the third substrate 103. For example, the curved, rigid display article 10, 110 may include the curved backlight 106 if the second substrate 105 is configured as a liquid crystal panel display.

The curved backlight 106 may be configured for enclosing or encasing the second substrate 105 and the third substrate 103 against the first substrate 101. As shown in FIG. 6B, the curved backlight 106 may surround an edge of the second substrate 105 and the third substrate 103 and may abut the first substrate 101. However, for embodiments which do not require a backlight, such as organic light-emitting diodes (OLEDs), the curved, rigid display article 10, 110 may not include the curved backlight. Further, as shown in FIGS. 6A and 6B, the curved, rigid display article 10, 110 may include a plurality of curved backlights 106, e.g., two curved backlights 106, if the curved, rigid display article 10, 110 includes more than one first substrate 101 and second substrate 105. For example, for vehicle instrument clusters and infotainment devices that are viewable by both a driver and passenger, respectively, the curved, rigid display article 10, 110 may be disposed along an entire length of a vehicle dashboard and may therefore include more than one first substrate 101, more than one second substrate 105, more than one third substrate 103, and more than one corresponding curved backlight 106.

Referring now to FIG. 3, the curved, rigid display article 10, 110 also includes the curved frame 108 adhered to the first substrate 101. The curved frame 108 may be both rigid and curved. That is, the curved frame 108 may have a radius of curvature of from 0.1 mm to 300 mm and may be configured as a structural support for the first substrate 101 optically bonded to the second substrate 105, and, where applicable, the third substrate 103 and/or curved backlight 106. Stated differently, the curved frame 108 may not be flexible or bendable, and may not be transitionable from an initial geometry to a final geometry. For example, the curved frame 108 may be a vehicle dashboard or a computer or television frame that is arranged or shaped to support the optically bonded materials.

Further, referring to FIG. 7A, the curved, rigid display article 10, 110 also includes a structural adhesive 107 disposed between and in contact with the first substrate 101 and the curved frame 108 such that the curved frame 108 is adhered to the first substrate 101. The structural adhesive 107 may anchor the first substrate 101 to the curved frame 108 and may be applied as a curable liquid that, once cured, may impart the curved, rigid display article 10, 110 with excellent tensile strength such that the first substrate 101 may not separate from the curved frame 108. That is, the structural adhesive 107 may be capable of withstanding any stress provoked by an elastic recovery of cold formed substrates 101, 105, 103. The structural adhesive 107 may be, by way of non-limiting examples, an adhesive tape or a curable adhesive dispensed as a liquid.

Therefore, the curved, rigid display article 10, 110 may be curved in final form and may be operational and viewable at various viewing angles. Further, the curved, rigid display article 10, 110 may be structurally robust, may have excellent display performance, may include a minimal distance between the first substrate 101 and the second substrate 105 based on a thickness 126 (FIG. 5) of the optical bonding material 102, and may be suitable for applications requiring curved shapes.

Referring now to FIG. 8, the method 12 of forming the curved, rigid display article 10, 110 includes providing 32 the first substrate 101 and the second substrate 105 each having the first initial geometry and second initial geometry, respectively. That is, as set forth above, one or both of the first substrate 101 and the second substrate 105 may be flat at room temperature or may be curved at room temperature. Importantly, each of the first substrate 101 and the second substrate 105 is flexible and bendable at room temperature.

The method 12 also includes optically bonding 14 the first substrate 101 and the second substrate 105 together with the optical bonding material 102 to form an initial workpiece 16 (FIG. 4) having a geometry that matches one of the first initial geometry and the second initial geometry. For example, the first substrate 101 and the second substrate 105 may have a slightly curved initial geometry or may be flat and the method 12 may include disposing the optical bonding material 102 between the first substrate 101 and the second substrate 105 in the initial geometry. That is, the first substrate 101 and second substrate 105 may be bonded together in a flat or curved state. Further, there may be a mismatch between the initial geometry of the first substrate 101 and the second substrate 105 such that the first substrate 101 is flat and the second substrate 105 is curved, or vice versa.

Optically bonding 14 may further include curing the optical bonding material 102 such that the first substrate 101 and the second substrate 105 are attached. Curing may include heating and solidifying the optical bonding material 102 disposed between the first substrate 101 and the second substrate 105. Further, vacuuming during assembly of the curved, rigid display article 10, 110 and autoclaving after curing of the optical bonding material 102 may not be necessary. Such optically bonding 14 may be useful for bonding when the first substrate 101 and the second substrate 105 have the same initial geometry or even when the first substrate 101 and the second substrate 105 have mismatched initial geometries. That is, the method 12 may include optically bonding 14 the first substrate 101 and the second substrate 105 together with the optical bonding material 102 to form the initial workpiece 16 such that the first radius of curvature is equal to the second radius of curvature.

In one embodiment described with reference to FIG. 10, optically bonding 14 may include forming the dam on the first substrate 101. For example, optically bonding 14 may include iteratively dispensing a plurality of layers 34 of the dam material 30 onto the first substrate 101 along the top surface 22 to thereby form the dam on the first substrate 101. That is, iteratively dispensing the plurality of layers 34 may deposit the plurality of layers 34 one at a time on top of one another to gradually build up the dam material on the first substrate 101. For example, optically bonding 14 may include 3-D printing the plurality of layers 34 onto the first substrate 101. Then, after forming the dam, the method 12 may include disposing the layer of optical bonding material 102 between the first substrate 101 and the second substrate 105 and compressing the first substrate 101 and second substrate 105 against the layer of optical bonding material 102.

Figure 10:
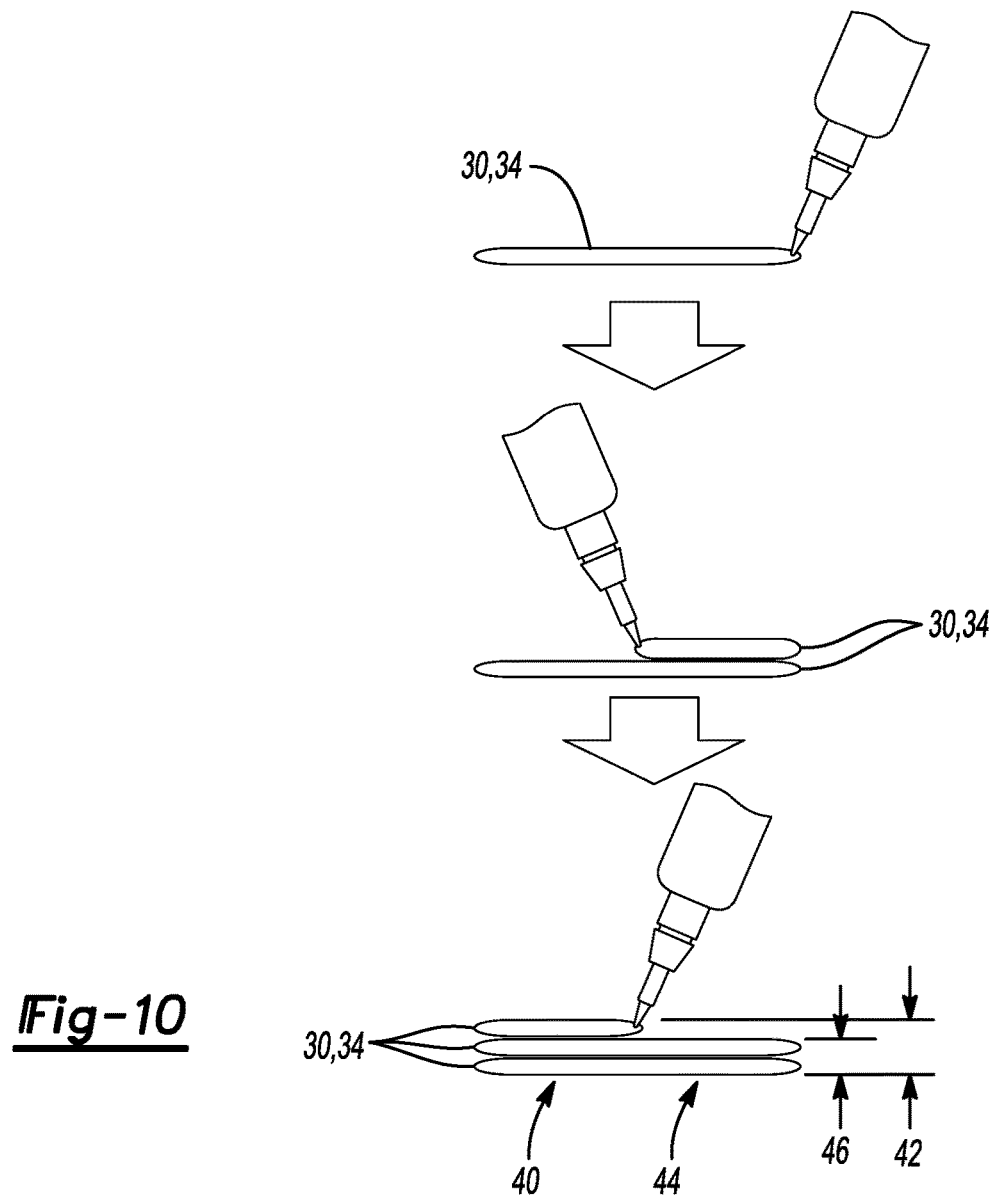
FIG. 10 is a schematic illustration of a side view of another portion of the method of FIG. 8.
Figure 11:
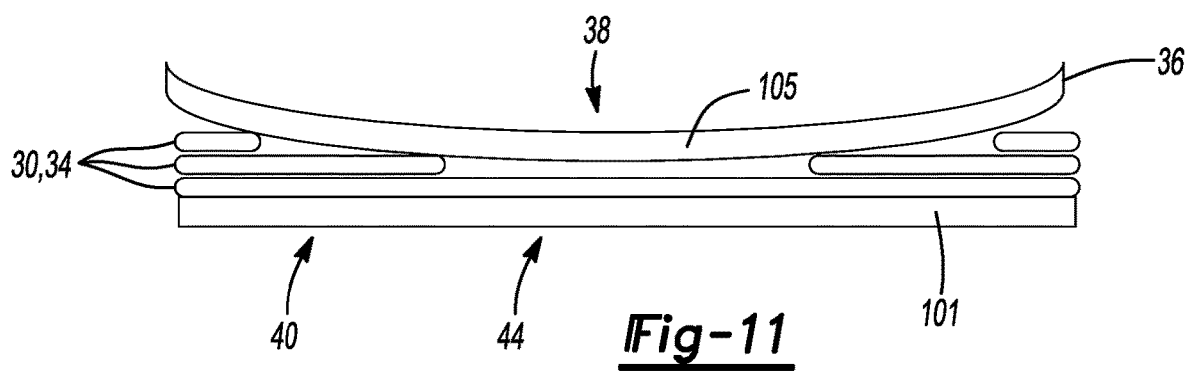
FIG. 11 is a schematic illustration of a side view of a further portion of the method of FIG. 8.

In addition, in some embodiments described generally with reference to FIGS. 10 and 11, the first substrate 101 may not have a radius of curvature and may be flat. In contrast, the second substrate 105 may have the second radius of curvature and may therefore have a slightly curved shape. Therefore, the second substrate 105 may be spaced comparatively farther away from the first substrate 101 at an edge 36 of the second substrate 105 than at a middle 38 of the second substrate 105.

In another embodiment, the first substrate 101 may have a first radius of curvature of at least 0.1 mm, i.e., the first substrate 101 may not be completely flat, and the second substrate 105 may have a second radius of curvature that is greater than the first radius of curvature and is less than or equal to 300 mm, i.e., the second substrate 105 may have a greater curvature than the first substrate 101. For this embodiment, optically bonding 14 may also include iteratively dispensing the plurality of layers 102, 104 of the optical bonding material onto the first substrate 101. Such iteratively dispensing allows tailoring of a height of certain portions 40, 44 of the optical bonding material on the first substrate 101. For example, optically bonding 14 may include 3-D printing the plurality of layers 102, 104 onto the first substrate 101 in a first portion 40 having a first total height 42 and in a second portion 44 having a second total height 46 that is less than the first total height 42. Therefore, such optical bonding may allow for complicated or mismatched initial geometries of the first substrate 101 and the second substrate 105.

For embodiments including the third substrate 103, the method 12 may also include optically bonding 14 together the third substrate 103 and the initial workpiece 16, i.e., one of the first substrate 101 and the second substrate 105. Such optically bonding 14 may occur in the manner set forth above as described with respect to attaching the first substrate 101 and the second substrate 105.

In addition, the method 12 also includes shaping 18 the initial workpiece 16 to form a shaped workpiece 48. For example, shaping 18 the initial workpiece 16 may include curving or flattening the initial workpiece 16. That is, shaping 18 may include bending or curving the initial workpiece 16 to the initial radius of curvature that is different from the first radius of curvature and/or the second radius of curvature, i.e., to a new shape. For example, the method 12 may first include optically bonding 14 two flat substrates 101, 105 to form the initial workpiece 16 and then bending the initial workpiece 16 to have a new initial radius of curvature and thereby form the shaped workpiece 48.

As described with reference to FIG. 7B, the method 12 also includes structurally bonding 50 together the shaped workpiece 48 and the curved frame 108 that is not flexible and has a final radius of curvature of from 0.1 mm to 300 mm with the structural adhesive 107 to thereby form the curved, rigid display article 10, 110. That is, after shaping 18 the initial workpiece 16 to form the shaped workpiece 48, i.e., after the initial workpiece 16 is bent or curved to shape, the method 12 includes structurally adhering the shaped workpiece 48 to the curved frame 108 so that the shaped workpiece 48 takes on and matches or mirrors a shape or geometry of the curved frame 108. Structurally bonding 50 may be a final process of the method 12. Therefore, the method 12 may process flexible substrates 101, 105 and workpieces 16 for as long as possible on an assembly line before rigidizing a final product, i.e., the curved, rigid display article 10, 110.

In one embodiment, structurally bonding 50 may include iteratively dispensing the plurality of layers 34 of the structural adhesive 107 onto the first substrate 101 and/or onto the curved frame 108. Such iteratively dispensing allows tailoring of a height of certain portions 40, 44 of the structural adhesive 107 on the first substrate 101 and/or curved frame 108. For example, structurally bonding 50 may include 3-D printing the plurality of layers 34 onto the first substrate 101 in the first portion 40 having the first total height 42 and in the second portion 44 having the second total height 46 that is less than the first total height 42. Therefore, such structurally bonding 50 may allow for complicated or mismatched shapes of the first substrate 101 and the curved frame 108. Further, such iterative structural bonding may allow for the curved frame 108 to include a border (not shown) along an edge of the curved frame 108.

Referring now to FIG. 9, in an additional embodiment, structurally bonding 50 may include dispensing a first adhesive 207 having a first hardness and a first cure time and a second adhesive 307 having a second hardness that is greater than the first hardness and a second cure time that is less than the first cure time onto at least one of the shaped workpiece 48 and the curved frame 108. That is, the first adhesive 207 may be a comparatively slow-curing adhesive and the second adhesive may be a comparatively fast-curing adhesive.

More specifically, dispensing the first adhesive 207 may include depositing the first adhesive 207 along an entire surface of at least one of the shaped workpiece 48 and the curved frame 108. However, dispensing the second adhesive 307 may include depositing the second adhesive 307 as the plurality of single points each spaced apart from one another without depositing the second adhesive 307 along the entire surface. Therefore, the second adhesive 307 may cure first and provide initial rigidity and fixation between the workpiece 48 and the curved frame 108 while the first adhesive 207 completely cures.

As such, the curved, rigid display article 10, 110 may be curved in final form and may be operational and viewable at various viewing angles. That is, the display article 10, 110 formed by the method 12 may be robust, may have excellent display performance, may include a minimal distance between the first substrate 101 and the second substrate 105, and may be suitable for applications requiring curved shapes. Further, the display article 10, 110 may have a reduced reflection between the first substrate 101 and the second substrate 105, and a refractive incidence almost coincident to all layers of the display article 10, 110. Further, since the method 12 is a consolidated and flexible process, the method 12 may be cost effective for producing the display article 10, 110.

While the best modes for carrying out the disclosure have been described in detail, those familiar with the art to which this disclosure relates will recognize various alternative designs and embodiments for practicing the disclosure within the scope of the appended claims.

What is claimed is:

1. A method of forming a curved, rigid display article, the method comprising:
    providing a first substrate having a first initial geometry and a second substrate having a second initial geometry;
    wherein the first substrate and the second substrate are bendable at room temperature;
    optically bonding the first substrate and the second substrate together with an optical bonding material to form an initial workpiece having a geometry that matches one of the first initial geometry and the second initial geometry;
    shaping the initial workpiece to form a shaped workpiece having a radius of curvature of at least 0.1 mm; and
    structurally bonding together the shaped workpiece and a curved frame that is not flexible and has a final radius of curvature of from 0.1 mm to 300 mm with a structural adhesive to thereby form the curved, rigid display article;
    wherein structurally bonding includes dispensing a first adhesive having a first hardness and a first cure time and a second adhesive having a second hardness that is greater than the first hardness and a second cure time that is less than the first cure time onto at least one of the shaped workpiece and the curved frame.

2. The method of claim 1, further including optically bonding together a third substrate and the initial workpiece.

3. The method of claim 1, wherein dispensing the first adhesive includes depositing the first adhesive along an entire surface of at least one of the shaped workpiece and the curved frame.

4. The method of claim 3, wherein dispensing the second adhesive includes depositing the second adhesive as a plurality of single points each spaced apart from one another without depositing the second adhesive along the entire surface.

5. The method of claim 1, wherein the first substrate has a first radius of curvature of at least 0.1 mm and the second substrate has a second radius of curvature that is greater than the first radius of curvature and less than or equal to 300 mm, and further wherein optically bonding includes iteratively dispensing a plurality of layers of the optical bonding material onto the first substrate.

6. The method of claim 5, wherein optically bonding includes 3-D printing the plurality of layers onto the first substrate in a first portion having a first total height and in a second portion having a second total height that is less than the first total height.

7. The method of claim 1, wherein the first substrate has a top surface and a bottom surface spaced apart from the top surface, and further wherein optically bonding includes iteratively dispensing a plurality of layers of a dam material onto the first substrate along the top surface to thereby form a dam on the first substrate.

8. The method of claim 1, wherein the first substrate has a first radius of curvature of at least 0.1 mm and the second substrate has a second radius of curvature that is greater than the first radius of curvature and less than or equal to 300 mm, and further wherein structurally bonding includes iteratively dispensing a plurality of layers of the structural adhesive onto the first substrate.

9. The method of claim 8, wherein structurally bonding includes 3-D printing the plurality of layers onto the first substrate in a first portion having a first total height and a second portion having a second total height that is less than the first total height.

10. The method of claim 1, wherein optically bonding further includes curing the optical bonding material.

11. A method of forming a curved, rigid display article, the method comprising:
    providing a first substrate and a second substrate, wherein the first substrate has a first radius of curvature at room temperature and the second substrate has a second radius of curvature at room temperature that is larger than the first radius of curvature;
    optically bonding the first substrate and the second substrate together with an optical bonding material to form an initial workpiece such that the first radius of curvature is equal to the second radius of curvature;
    shaping the initial workpiece to form a shaped workpiece; and
    structurally bonding together the shaped workpiece and a curved frame that is not flexible and has a final radius of curvature of from 0.1 mm to 300 mm to thereby form the curved, rigid display article;
    wherein structurally bonding includes dispensing a first adhesive having a first hardness and a first cure time and a second adhesive having a second hardness that is greater than the first hardness and a second cure time that is less than the first cure time onto at least one of the shaped workpiece and the curved frame.

12. The method of claim 11, wherein shaping the initial workpiece includes curving or flattening the initial workpiece.

13. The method of claim 11, further including, prior to shaping:
    optically bonding together a third substrate and the second substrate with a second layer of optical bonding material; and
    attaching a curved backlight to the third substrate such that the curved backlight faces the third substrate and surrounds the second substrate and the third substrate.

* * * * *